United States Patent

Nakazato et al.

[11] Patent Number: 5,867,627
[45] Date of Patent: Feb. 2, 1999

[54] RECORDING AND/OR REPRODUCING APPARATUS

[75] Inventors: Saburou Nakazato, Tokyo; Ryousuke Miyamoto, Ichikawa; Hiroyoshi Misumi, Yokohama; Yoshirou Udagawa, Tokyo; Shigeo Yamagata, Yokohama, all of Japan

[73] Assignee: Canon Kabushiki Kaisha, Tokyo, Japan

[21] Appl. No.: 247,416

[22] Filed: May 23, 1994

Related U.S. Application Data

[63] Continuation of Ser. No. 644,542, Jan. 23, 1991, abandoned.

[30] Foreign Application Priority Data

Jan. 24, 1990 [JP] Japan .................................. 2-013976

[51] Int. Cl.$^6$ ...................................................... H04N 5/76
[52] U.S. Cl. ............................................ 386/112; 358/906
[58] Field of Search ..................................... 358/335, 906, 358/310, 909.1, 426; 360/35.1; 386/46, 67, 68, 112, 120, 121, 5, 110; H04N 5/76, 5/77

[56] References Cited

U.S. PATENT DOCUMENTS

| | | | |
|---|---|---|---|
| 4,608,600 | 8/1986 | Sugiyama | 360/9.1 X |
| 4,611,250 | 9/1986 | Yoshinaka et al. | 360/9.1 |
| 4,661,862 | 4/1987 | Thompson | 360/9.1 X |
| 4,745,482 | 5/1988 | Baumeister | 358/213.29 |
| 4,774,599 | 9/1988 | Baumeister | 386/110 |
| 4,783,704 | 11/1988 | Funston | 358/313 |
| 4,809,097 | 2/1989 | Fujii et al. | 360/22 X |
| 4,887,169 | 12/1989 | Bannai et al. | 360/22 X |
| 4,918,538 | 4/1990 | Saito | 358/906 |
| 4,963,992 | 10/1990 | Doi et al. | 386/67 |
| 4,982,292 | 1/1991 | Itoh et al. | 358/426 |
| 5,019,919 | 5/1991 | Nagashima | 360/22 |
| 5,032,927 | 7/1991 | Watanabe et al. | 358/133 X |
| 5,047,875 | 9/1991 | Kozuki et al. | 358/909.1 |
| 5,050,230 | 9/1991 | Jones et al. | 358/426 |
| 5,067,031 | 11/1991 | Yamasaki et al. | 360/22 |

FOREIGN PATENT DOCUMENTS

| | | |
|---|---|---|
| 0293189 | 11/1988 | European Pat. Off. . |
| 3908890 | 10/1989 | Germany . |

*Primary Examiner*—Thai Tran
*Assistant Examiner*—Huy Nguyen
*Attorney, Agent, or Firm*—Fitzpatrick, Cella, Harper & Scinto

[57] ABSTRACT

Apparatus and method for recording and/or reproducing an image frame in plural blocks utilizes a memory for storing an image signal for one field. The image signal for one field is then divided into n blocks by reading the image signal from the memory n times where n is an integer equal to at least two. The n divided image signals are then subjected to one-channel signal processing, and the respective image signals subjected to the signal processing are then recorded on a recording medium sequentially in different tracks. During reproduction, if little time is available, only selected ones of the n blocks are read and the entire image is interpolated therefrom.

35 Claims, 11 Drawing Sheets

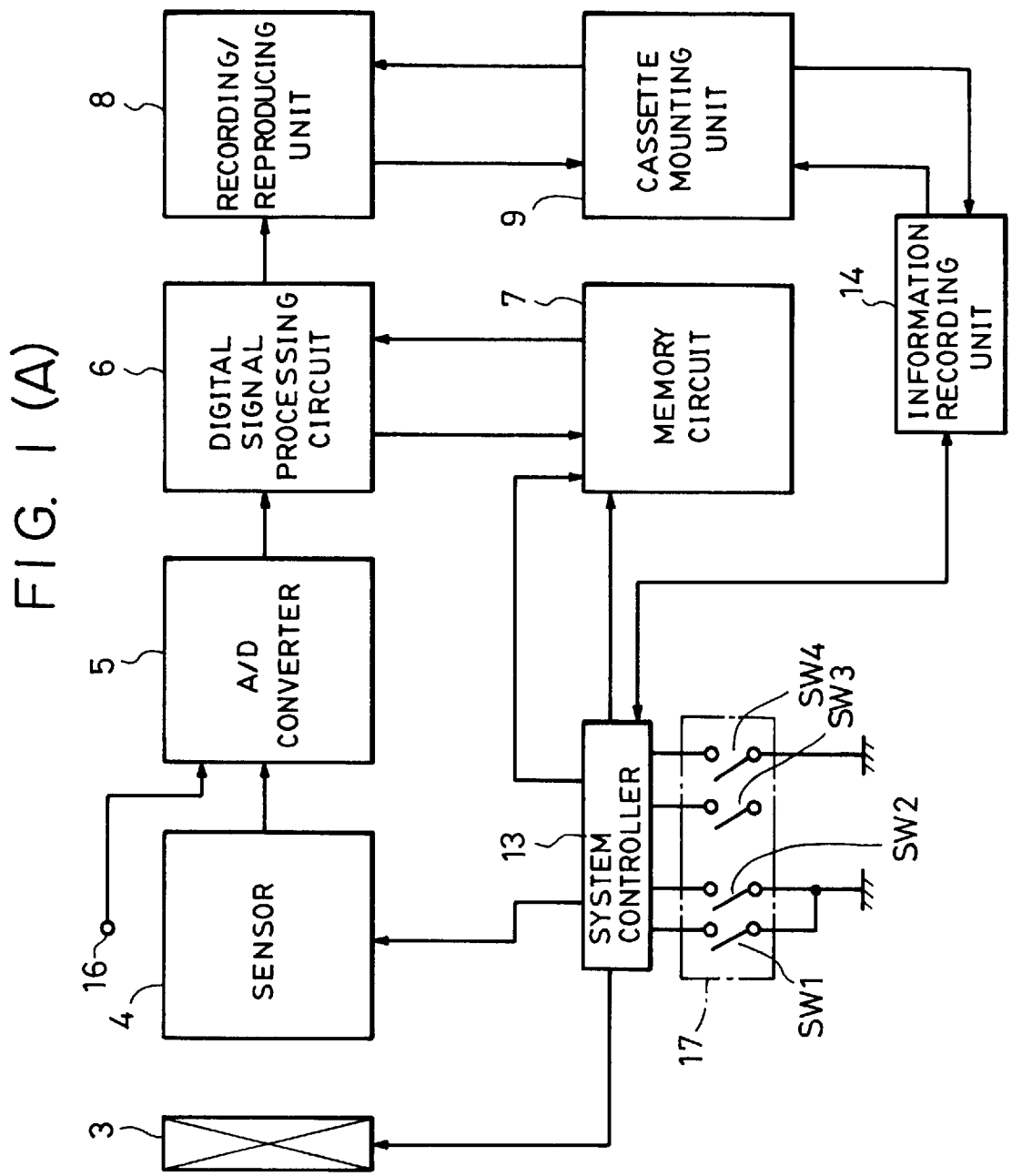

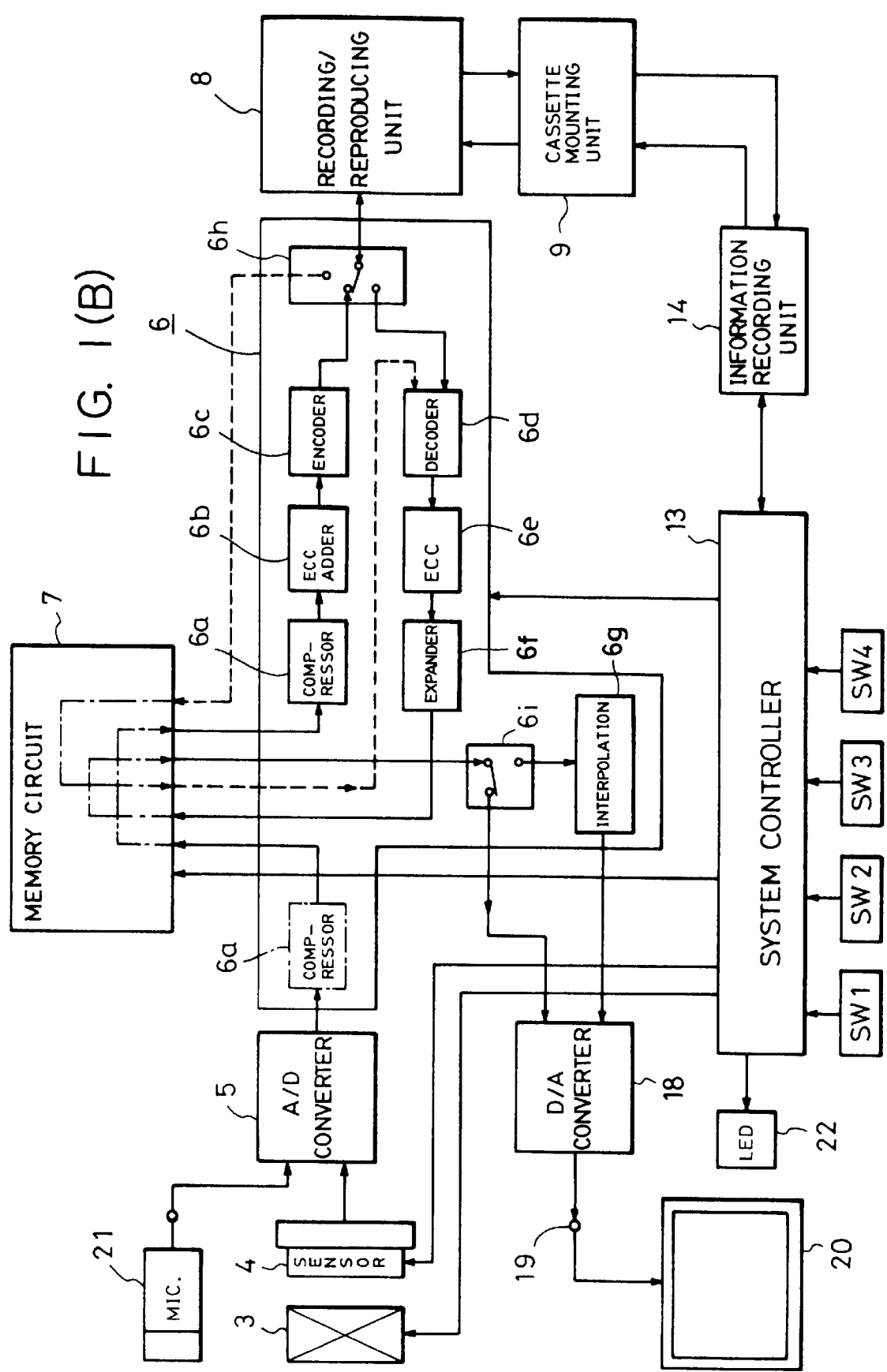

FIG. 4

| $a_{11}$ | $c_{12}$ | $a_{13}$ | $c_{14}$ | $a_{15}$ | $c_{15}$ |
|---|---|---|---|---|---|
| $d_{21}$ | $b_{22}$ | $d_{23}$ | $b_{24}$ | $d_{25}$ | $b_{26}$ |
| $a_{31}$ | $c_{32}$ | $a_{33}$ | $c_{34}$ | $a_{35}$ | $c_{36}$ |
| $d_{41}$ | $b_{42}$ | $d_{43}$ | $b_{44}$ | $d_{45}$ | $b_{46}$ |
| $a_{51}$ | $c_{52}$ | $a_{53}$ | $c_{54}$ | $a_{55}$ | $c_{56}$ |
| $d_{61}$ | $b_{62}$ | $d_{63}$ | $b_{64}$ | $d_{65}$ | $b_{66}$ |

|  |  |  |  |  |  |  |
|---|---|---|---|---|---|---|
| $a_{11}$ |  | $a_{13}$ |  | $a_{15}$ |  |  |
|  |  |  |  |  |  |  |
| $a_{31}$ |  | $a_{33}$ |  | $a_{35}$ |  |  |
|  |  |  |  |  |  |  |
| $a_{51}$ |  | $a_{53}$ |  | $a_{55}$ |  |  |
|  |  |  |  |  |  |  |

|  |  |  |  |  |  |  |
|---|---|---|---|---|---|---|
|  |  |  |  |  |  |  |
|  | $b_{22}$ |  | $b_{24}$ |  | $b_{26}$ |  |
|  |  |  |  |  |  |  |
|  | $b_{42}$ |  | $b_{44}$ |  | $b_{46}$ |  |
|  |  |  |  |  |  |  |
|  | $b_{62}$ |  | $b_{64}$ |  | $b_{66}$ |  |

|  |  |  |  |  |  |  |
|---|---|---|---|---|---|---|
|  | $c_{12}$ |  | $c_{14}$ |  | $c_{16}$ |  |
|  |  |  |  |  |  |  |
|  | $c_{32}$ |  | $c_{34}$ |  | $c_{36}$ |  |
|  |  |  |  |  |  |  |
|  | $c_{52}$ |  | $c_{54}$ |  | $c_{56}$ |  |
|  |  |  |  |  |  |  |

|  |  |  |  |  |  |  |
|---|---|---|---|---|---|---|
|  |  |  |  |  |  |  |
| $d_{21}$ |  | $d_{23}$ |  | $d_{25}$ |  |  |
|  |  |  |  |  |  |  |
| $d_{41}$ |  | $d_{43}$ |  | $d_{45}$ |  |  |
|  |  |  |  |  |  |  |
| $d_{61}$ |  | $d_{63}$ |  | $d_{65}$ |  |  |

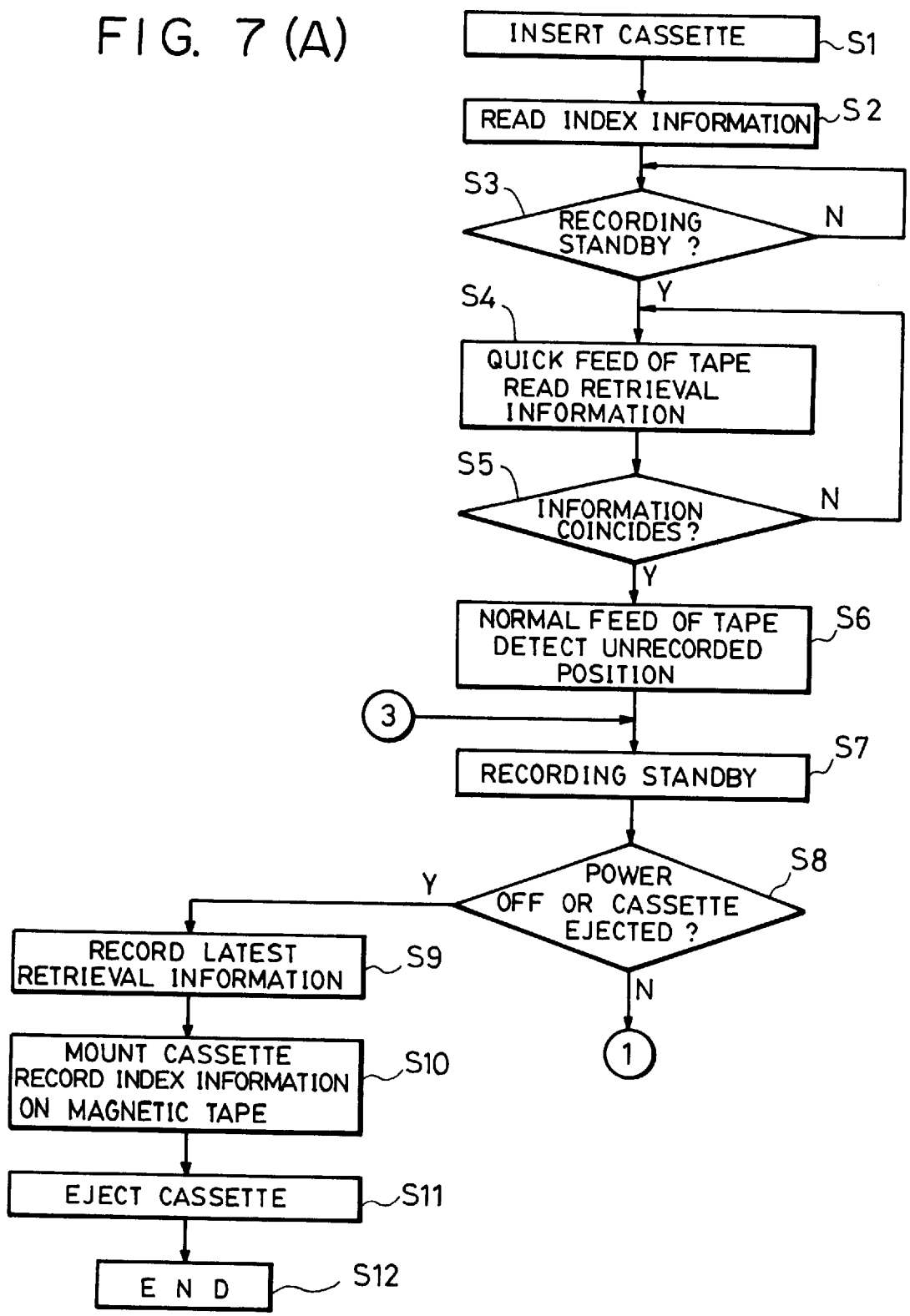

RECORDING AND/OR REPRODUCING APPARATUS

This application is a continuation of application Ser. No. 07/644,542 filed Jan. 23, 1991, now abandoned.

BACKGROUND OF THE INVENTION

1. Field of the Invention

This invention relates to a recording and/or reproducing apparatus for recording and/or reproducing various kinds of information signals, such as digital image signals and the like, on a recording medium, such as a magnetic tape or the like.

2. Description of the Prior Art

Apparatuses have been generally known which record various kinds of digital signals, such as image signals, voice signals and the like, on a magnetic tape carried within a small cassette. In such a magnetic recording/reproducing apparatus, the above-described information signals are transmitted through a transmission system within the apparatus at a predetermined speed, and signal processing and other kinds of processing, such as recording/reproducing processing and the like, are performed.

It is preferred that the transmission speed of a signal in the above-described magnetic recording/reproducing apparatus is low in consideration of processing speeds of various kinds of signals.

However, if the transmission speed is lowered, a long time is needed for recording when recording an image signal which has a large amount of information.

That is, if the transmission speed is set to about 768 Kbits (kilobits)/sec {2(ch)×32 (KHz (kilohertzs))×12 (bits)} which is sufficient for the transmission of a voice signal, a time of about 4.8 seconds is needed for recording an image signal for one frame [3.7 Mbits (megabits){640 (picture elements)×480 (picture elements)×1.5 (Y+C)}] which is more or less sufficient as an image signal.

Accordingly, when, for example, the above-described magnetic recording/reproducing apparatus is used for an electronic still-picture camera, the camera has the disadvantage that the shutter timing is restricted, and hence a successive photographing function (which is an indispensable function for a camera) is also restricted.

The above-described disadvantage due to the slow transmission speed also causes a problem in a reproducing operation as well as in a recording operation because a long time is needed for a reproducing operation.

Furthermore, the use of a magnetic tape as a recording medium has the disadvantage that more time is needed for searching for recording and reproducing positions, causing inconvenience to the user.

SUMMARY OF THE INVENTION

The present invention has been made in consideration of the above-described problems.

It is an object of the present invention to reduce inconvenience in the time required to record and reproduce an image signal having a relatively large capacity while suppressing the transmission speed.

This object is accomplished, according to one aspect of the present invention, by a recording apparatus, characterized in that it stores an image signal obtained by a single photographing operation in a memory circuit, samples the image signal to divide it into a plurality of blocks, and records image signals in respective divided blocks on different areas on a recording medium.

According to another aspect, the present invention relates to a reproducing apparatus for reproducing a signal from a recording medium on which image signals in n blocks (obtained by dividing an image signal for one field into the n blocks) are recorded in different areas, characterized in that it reproduces image signals in respective blocks, and interpolates unreproduced image signals using the reproduced image signals in units of a block to obtain the image signal for one field.

According to a further aspect of the present invention, a recording apparatus includes (a) memory means for storing an image signal for one field, (b) control means for dividing the image signal for one field into n blocks by reading the image signal from said memory means n times, where n is an integer equal to at least 2, (c) one-channel signal processing means for sequentially performing signal processing of the n divided image signals, and (d) recording means for recording the respective image signals subjected to signal processing on a recording medium sequentially on different tracks.

According to a further aspect of the present invention, a recording method comprises the steps of storing an image signal for one field obtained by one image sensing operation in memory means, dividing the image signal for one field into a plurality of blocks by reading the signal in units of a block from said memory means selectively using a plurality of subsampling patterns, and recording divided image signals in respective blocks in different areas on a recording medium in units of each block.

According to yet another aspect of the present invention, a recording method comprises the steps of dividing an image signal for one field obtained by one image sensing operation into a plurality of blocks, recording data in the respective blocks in different areas on a recording medium, and changing the number of blocks to be recorded in accordance with a photographing timing.

According to a further aspect of the present invention, a reproducing method for reproducing information from a recording medium on which image signals in n blocks obtained by dividing an image signal for one field into the n blocks have been recorded on different tracks, includes the steps of reproducing image signals in units of a block, and obtaining the image signal for one field by interpolating unreproduced image signals using the reproduced image signals in units of a block.

According to yet a further aspect of the present invention, a signal processing apparatus includes a signal processing apparatus for performing predetermined signal processing on a supplied signal to produce a plurality of data blocks from one data frame, a plurality of memory circuits for respectively storing the plurality of data blocks, and control means for variably connecting one or more of the memory circuits to said signal processing means.

According to yet another aspect of the present invention, a camera apparatus includes (a) image sensing means for obtaining an image signal by performing photoelectric conversion of light from an object, (b) memory means for storing the image signal for one field obtained from the image sensing means, (c) signal dividing means for dividing the image signal for one field into n blocks by sequentially reading said image signal in a predetermined sequence, (d) recording means for sequentially recording the image signals divided into blocks in different respective areas on a recording medium, and (e) control means for controlling a recording operation by said recording means in a successive image sensing operation wherein image sensing operations are repeated at least with a predetermined time interval.

According to the apparatuses having the above-described configurations, it is possible to solve inconvenience in handling image information having a large capacity with a slow transmission speed.

That is, by dividing an image signal for one field into a plurality of blocks and sequentially recording images in respective blocks, it is possible to delete images in units of a block whenever necessary, and thereby to shorten the recording time.

Also in a reproducing operation, by reproducing only minimum necessary blocks, it is possible to perform a high-speed reproducing operation and the like.

Other objects and features of the present invention will become more apparent from the following description taken in connection with the accompanying drawings.

BRIEF DESCRIPTION OF THE DRAWINGS

FIGS. 1(A) and 1(B) are block diagrams showing the configuration of an embodiment of the magnetic recording/reproducing apparatus according to the present invention;

FIG. 4 is a diagram schematically showing an arrangement of picture elements of an image signal for one field;

FIGS. 5(A)–5(D) are diagrams schematically showing arrangements of picture elements in respective divided blocks;

DETAILED DESCRIPTION OF THE PREFERRED EMBODIMENT

The preferred embodiment of the present invention will now be explained in detail with reference to FIGS. 1(A) through FIG. 10.

FIGS. 1(A) and 1(B) are block diagrams showing the configuration of an embodiment of the magnetic recording/reproducing apparatus according to the present invention. FIG. 1(B) illustrates FIG. 1(A) in more detail. In the present embodiment, digitized image signals, voice signals and the like are selectively recorded on respective tracks, which will be described later, on a magnetic tape received within a small cassette as shown in FIG. 2.

Figure 2:
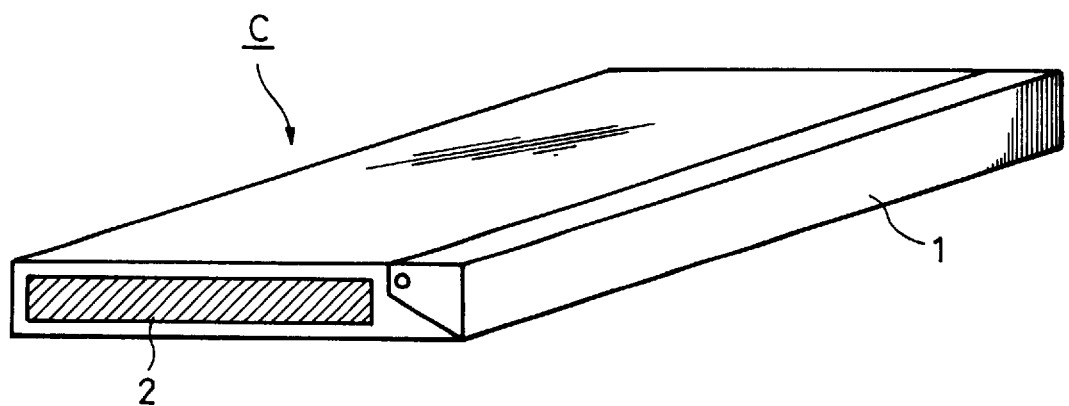
FIG. 2 is a perspective view showing a cassette according to the present invention.
Figure 3:
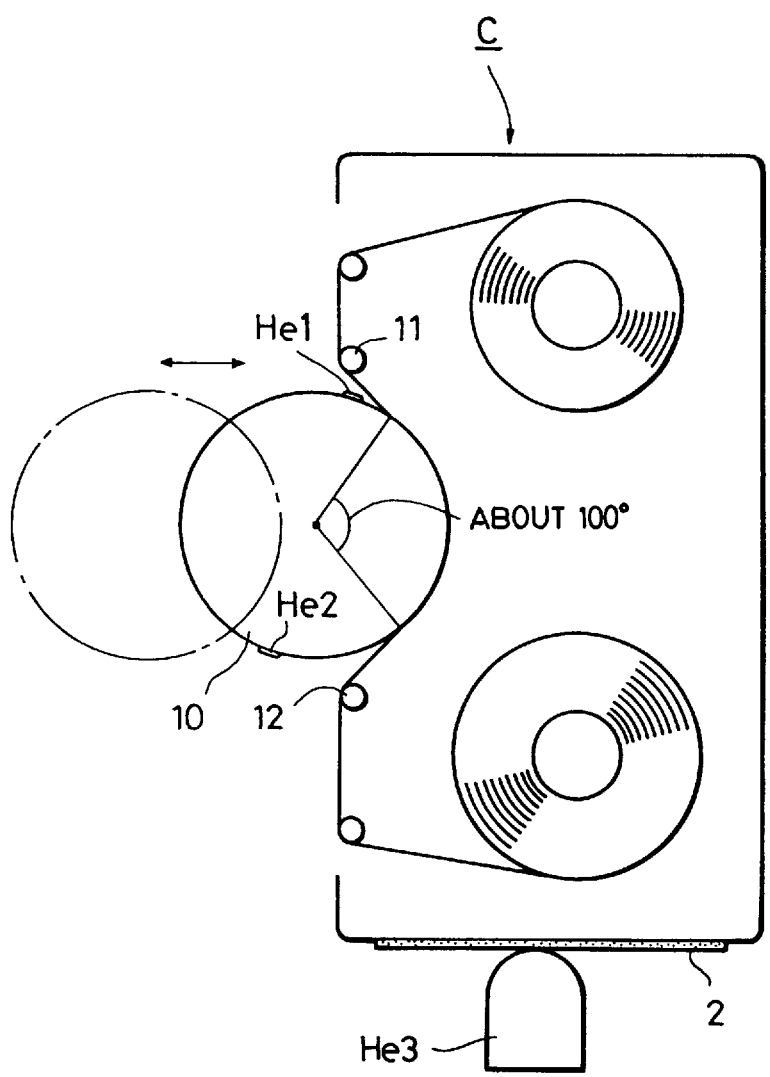
FIG. 3 is a schematic plan view showing a principal part of a cassette mounting unit.

As shown in FIGS. 2 and 3, the above-described cassette C receives a magnetic tape Tp wound between a pair of tape reels disposed within the main body of the cassette C. The magnetic tape faces the outside via a cover 1 disposed at the front of the cassette C. On a side of the cassette C is formed a magnetic recording member 2, on which index information relative to the amount of information recorded on the magnetic tape, and the like is recorded.

In the present embodiment using the magnetic tape within the cassette C as a recording medium, photographing light from an object incident upon a sensor 4, such as a CCD (charge-coupled device) or the like, via an optical system 3 (having a diaphragm mechanism, an autofocusing mechanism and the like), is subjected to photoelectric conversion. An image signal thereby obtained is amplified by a predetermined amount by a preamplifier (not shown), and is then converted into a digital signal having a predetermined number of bits by an A/D (analog-to-digital) converter 5. The sampling frequency of the A/D converter 5 in the present embodiment is 32 KHz, and the quantization bits comprise eight bits.

A voice signal is supplied to the A/D converter 5 from a microphone 21 via input terminal 16.

The digitized image signal and the like are first stored in a memory circuit 7 having a storage capacity of at least one frame via a digital signal processing circuit 6. The stored image signal and the like are sampled in a predetermined number of blocks (4 blocks in the present embodiment), as will be described later, and are sequentially read in units of a block.

After being subjected to predetermined signal processing, such as compression, addition of error correcting codes, encoding and the like, for every data in respective blocks by the digital signal processing circuit 6, the read image signals and the like are supplied to a recording/reproducing unit 8, where the signals are recorded on the magnetic tape within the cassette C mounted in a cassette mounting unit 9 while each block is allocated to one track or a plurality of tracks.

The number of recorded tracks for data in one block may be arbitrarily set in accordance with the transmission speed of the apparatus.

The signal processing circuit 6 includes a compressor 6a for performing the above-described signal processing, an error correcting code adder 6b, and an encoder 6c for performing an encoding operation, such as (8 10) transformation, mirror transformation or the like, for reducing a low-frequency component. The circuit 6 also includes a decoder 6d for performing processing (to be described later) of reproduced digital signals, an error correction circuit 6e, an expander 6f, an interpolation circuit 6g, and switching circuits 6h and 6i for switching signal lines when, for example, inputting (recording) and outputting (reproducing) a signal.

The recording/reproducing unit 8 includes a rotating drum 10 (FIG. 3) having two rotating heads He1 and He2 for recording and reproducing image signals and the like on the magnetic tape Tp. As shown in FIG. 3, when the cassette C is mounted in the cassette mounting unit 9 of the recording/reproducing unit 8, the rotating drum 10 moves to the inside of the cassette C, and is pressed against the magnetic tape guided by tape guides 11 and 12 at the front of the cassette C.

Thus, in the present embodiment, it is possible to wind the magnetic tape over an angle range of about 100° around an outer circumference of the rotating drum 10 without loading the magnetic tape.

Figure 6:
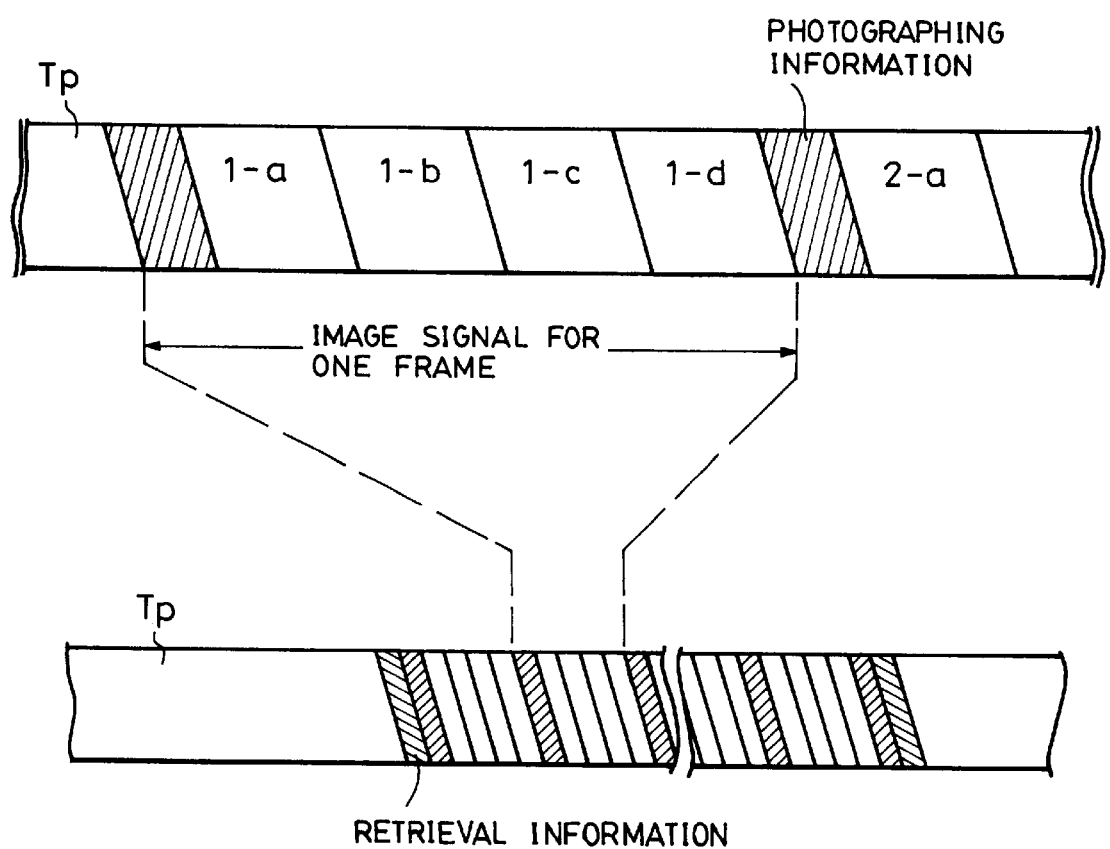
FIG. 6 illustrates diagrams schematically showing recorded patterns of respective blocks constituting an image signal for one field, and recorded patterns of image signals for a plurality of fields.
Figure 7:
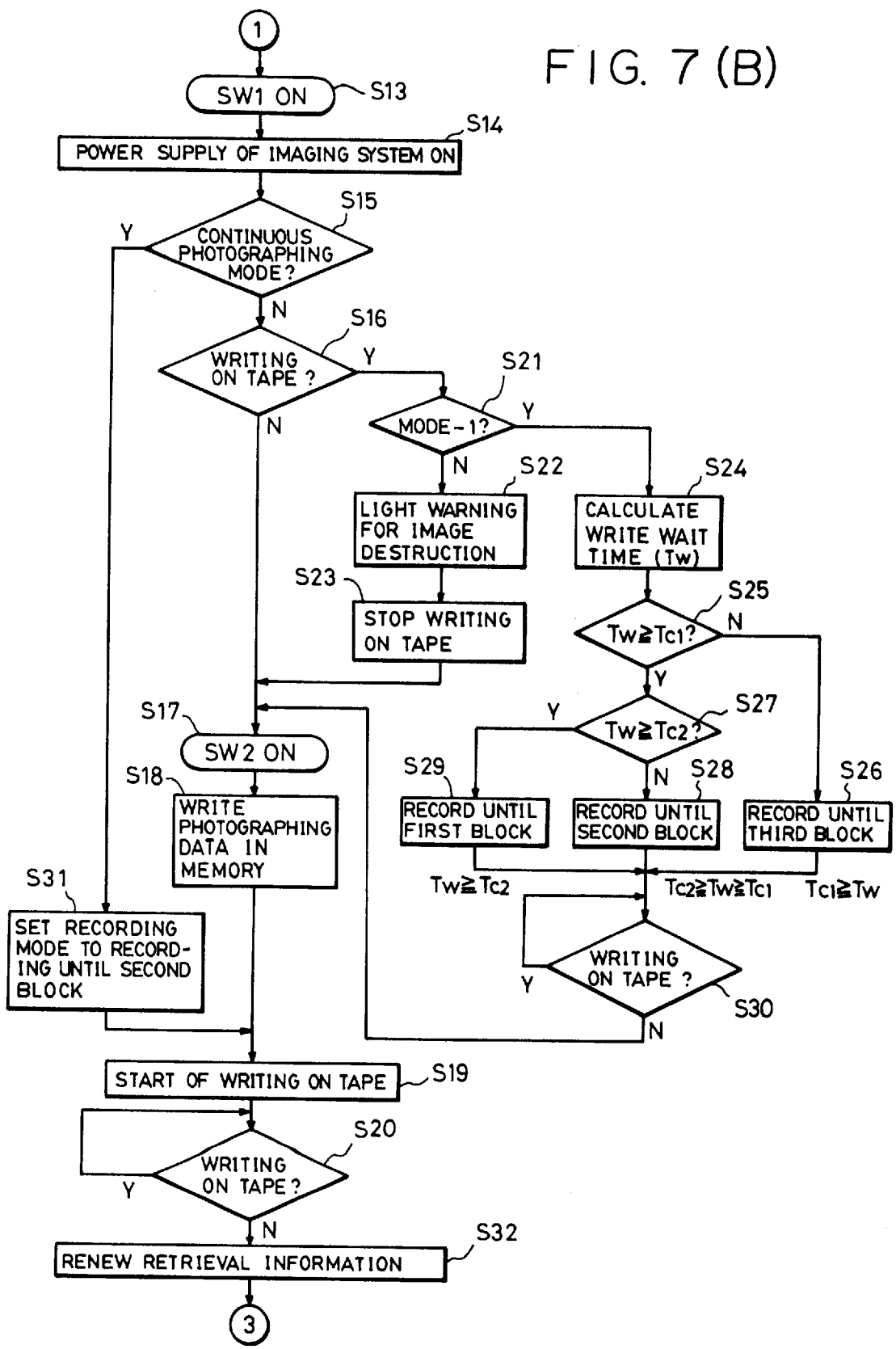
FIGS. 7(A) and 7(B) are flowcharts showing a recording operation.

The rotating drum 10 is inclined at a predetermined angle relative to the longitudinal direction of the magnetic tape. Hence, by running the magnetic tape by a reel driving means (not shown) while rotating the rotating drum 10, image signals, voice signals, photographing information (index signals), which will be described later, and the like are obliquely recorded on the magnetic tape, as shown in FIG. 6. The reel driving means supplies a supply-side reel with a predetermined amount of load, thereby providing a contact pressure between the magnetic tape and the rotating heads.

The recording/reproducing unit 8 also includes a magnetic head He3 for recording and reproducing index information to and from the magnetic recording member 2 formed on the side of the cassette C. The magnetic head He3 contacts the magnetic recording member 2 in accordance with a mounting operation of the cassette C in the cassette mounting unit 9. Index information relative to the recorded amounts (the number of recorded frames and the number of blocks) is supplied from a system controller 13 including a microcomputer or the like to the magnetic head He3 via an information recording unit 14.

In addition to supplying the above-described information, the system controller 13 supplies the digital signal processing circuit 6 with the above-described photographing information, such as the dates of photographing operations, whether or not a strobe has been used, and the like, and the number of photographed frames and retrieval information relative to the number of recorded blocks for every predetermined number of photographed frames to record such information together with image signals and the like.

In accordance with the operation of an operation unit 17 having two-stage shutter release switches SW1 and SW2, a successive photographing mode setting switch SW3, a reproducing mode setting switch SW4 and the like, the system controller 13 performs the system control for the entire apparatus (such as the control of the above-described optical system 3 and sensor 4, the read control (subsampling control) of the memory circuit 7, mode control and the like).

Next, an explanation will be provided of a subsampling operation of an image signal and recorded patterns.

In the present embodiment, by controlling a reading operation of an image signal for one frame (for example, 640×480 picture elements) as shown in FIG. 4 from the memory circuit 7, the image signal for one frame is subjected to subsampling into four blocks, as shown in FIGS. 5(A) through 5(D). That is, the first block samples odd-numbered picture elements on odd-numbered lines, the second block samples even-numbered picture elements on even-numbered lines, the third block samples even-numbered picture elements on odd-numbered lines, and the fourth block samples odd-numbered picture elements on even-numbered lines.

These blocks are sequentially recorded on respective predetermined tracks, as shown in FIG. 6.

In FIG. 6, the first, second, third and fourth blocks of the image signal for the first frame are recorded on areas 1-a, 1-b, 1-c and 1-d, respectively. The first block of an image signal for the second frame is recorded on an area 2-a. Each area comprises one track or a plurality of tracks.

The above-described photographing information is recorded on the leading track of each block.

For every unit consisting of a certain number (in the present embodiment, one unit comprises 16 frames) of image signals, each composed of blocks, for respective frames, the above-described retrieval information relative to the total number of recorded blocks and the number of frames within the unit is recorded together with the photographing information.

The method of sampling is not limited to the above-described method, but other methods and arrangements of sampled picture elements may also be adopted.

In the present embodiment, after being subjected to predetermined signal processing, such as decoding, error correction, expansion and the like, by the signal processing circuit 6 for every data in respective blocks, digital image signals reproduced by the recording/reproducing unit 8 are first stored in the memory circuit 7 in units of a block.

Subsequently, the digital image signals read from the memory circuit 7 are supplied, as they are or by being interpolated, to a D/A (digital-to-analog) converter 18 via the signal processing circuit 6, and are converted into analog image signals. The converted analog signals are output to a monitor 20 or the like via output terminal 19.

The reading operation of the signals from the memory circuit 7 is controlled by the system controller 13 operating in accordance with the operation of the reproducing mode setting switch SW4.

Next, an explanation will be provided of the operation of the above-described magnetic recording/reproducing apparatus.

FIGS. 7(A) and 7(B) are flowcharts showing a recording operation.

First, when the cassette C has been inserted and mounted in the cassette mounting unit 9 of the recording/reproducing unit 8 (S1), index information recorded on the side of the cassette C is read (S2) to detect the recording status of the entire magnetic tape, for example, whether or not unrecorded portions are present.

Next, the apparatus confirms whether or not the apparatus is in a standby state for recording (S3). If the apparatus is in a standby state, the magnetic tape is run at a high speed to read the retrieval information from the magnetic tape (S4).

Subsequently, the apparatus detects whether or not the retrieval information coincides with the index information, that is, whether or not any unrecorded portion is present within image signal recording areas for a plurality of frames represented by the retrieval information (S5). If the result is affirmative, the running speed of the magnetic tape is set to a normal speed to detect an unrecorded position (S6).

As described above, in the present embodiment, since it is possible to approximately know an unrecorded position when the cassette C has been mounted, the magnetic tape can be run at a high speed to that position only by intermittent reading operations of the retrieval information. Thus, it is possible to greatly improve the so-called cueing speed to find a recorded position.

Also when a cueing operation is performed by assigning a position to be reproduced, the operation can be performed at a high speed.

Subsequently, the standby state for recording operation is performed again (S7), and the apparatus detects whether or not the power supply of the apparatus is turned off or the cassette C is ejected (S8).

If the power supply is turned off, the latest retrieval information is newly recorded (S9), new index information is recorded (S10), the cassette C is ejected (S11), and the process is terminated (S12).

If the power supply is turned off and the cassette C is not ejected at step S8, the shutter release switch SW1 is switched on (S13), and the power supply of the photographing system is also turned on (S14), as shown in FIG. 7(B).

Subsequently, the apparatus detects whether or not the apparatus is in the successive photographing mode (S15). If the apparatus is not in the successive photographing mode, the apparatus detects whether or not any signal is being recorded on the magnetic tape (S16).

If no signal is being recorded on the magnetic tape, an image signal obtained by an exposing operation caused by switching on the shutter release switch SW2 (S17) is written in the memory circuit 5 (S18). A photometric calculation or the like is performed with a predetermined timing between the switching operations of the shutter release switch SW1 and the shutter release switch SW2. After switching on the shutter release switch SW2, an exposing operation, the drive of an electronic shutter, and a reading operation of the sensor are performed.

Subsequently, image signals in respective blocks read by being sampled from the memory circuit 7 as described above are subjected to the above-described signal processing, and are sequentially recorded on the magnetic tape (S19). The recording operation continues until all the blocks are recorded (S20).

If any signal is being recorded at step S16, the apparatus determines whether or not the apparatus is in an image destruction prohibiting mode (S21). The image destruction prohibiting mode is a mode to prohibit a new recording operation of the next block until at least all the blocks in the course of recording are recorded, because unrecorded picture-element data disappear within respective blocks if the recording operation is interrupted.

If the apparatus is not in the image destruction prohibiting mode, an image destruction warning is issued from a display means 22 composed of an LED (light-emitting diode) or the like (S22), the recording operation is stopped (S23), and the process proceeds to step S17.

If the apparatus is in the image destruction prohibiting mode at step S21, a time $T_W$ needed to record the remaining blocks is calculated (S24). The apparatus then detects which of the time $T_W$ and a predetermined time $T_{C1}$ is longer (S25). The time $T_{C1}$ is a time needed to record one block. If the time $T_W$ is shorter than the time $T_{C1}$, blocks can be recorded until the third block, but the fourth block cannot be recorded, because the fourth block can be recorded only until its midsection. Hence, recording is performed until the third block (S26).

If the time $T_W$ is longer than the time $T_{C1}$ at step S25, the apparatus detects which of the time $T_W$ and another time $T_{C2}$ is longer (S27). The time $T_{C2}$ is a time needed to record two blocks. If the time $T_W$ is shorter than the time $T_{C2}$, blocks can be recorded until the second block, but the third block cannot be recorded. Hence, recording is performed until the second block (S28). If the time $T_W$ is longer than the time $T_{C2}$, recording is performed until the first block (S29).

The recording operation is continued until recording as described above has been completed (S30). The process proceeds to step S17 when recording has been completed until a predetermined block.

If the apparatus is set to the successive photographing mode at the above-described step S15, the recording mode is uniquely set to recording until the second block (S31), and the process proceeds to the above-described step S19.

When recording has been completed at step S20, the process returns to the above-described step S7.

As described above, in the present embodiment, an image signal for one frame is equally divided into four blocks, and respective blocks are sequentially recorded. Hence, when it is necessary to continuously perform recording operations within a short time as in the successive photographing mode, it is possible to remove restrictions on the recording operation due to a slow transmission speed.

Figure 8:
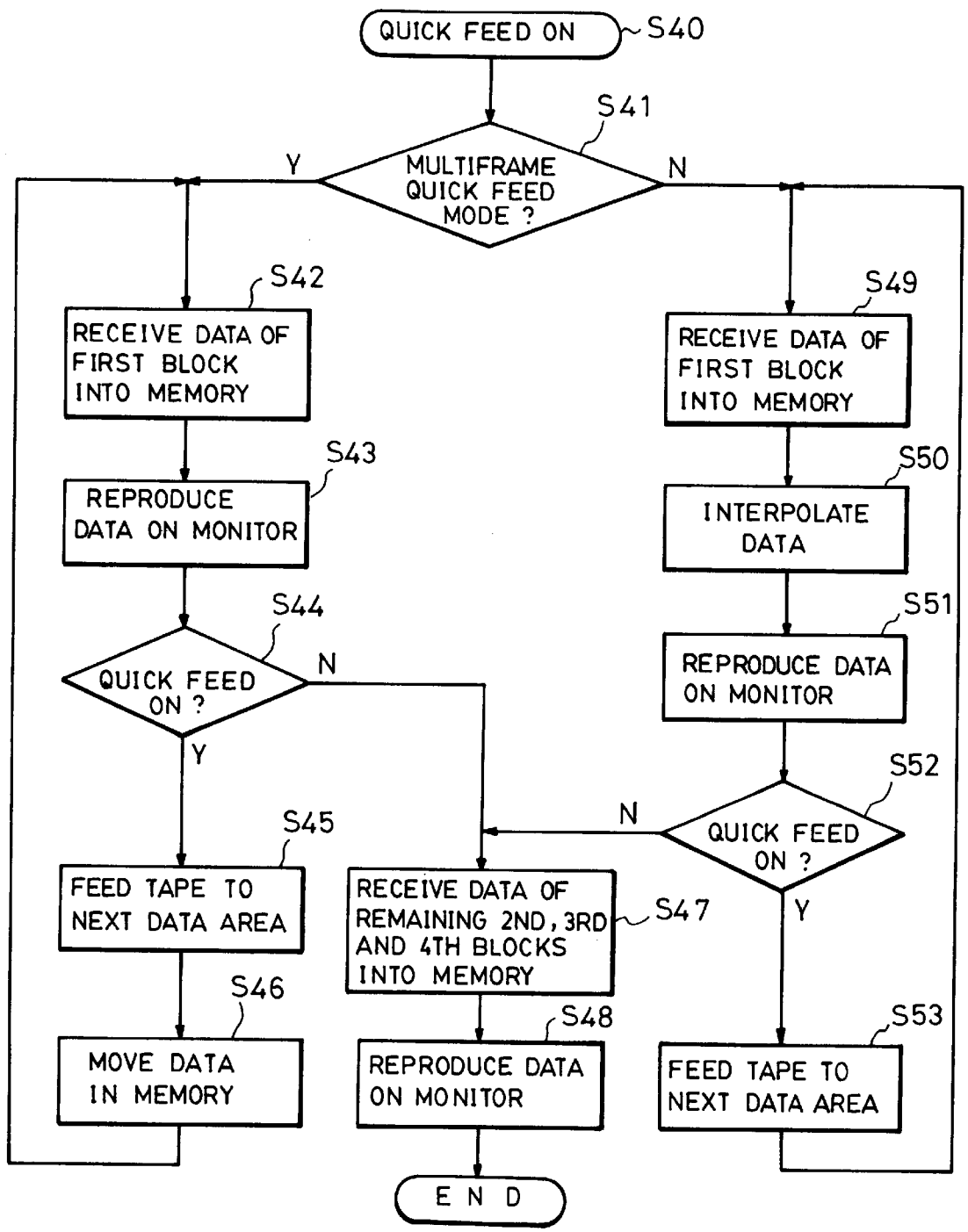
FIG. 8 is a flowchart showing a quick-feed operation.

Next, an explanation will be provided of a quick-feed reproducing operation in the magnetic recording/reproducing apparatus of the present embodiment with reference to the flowchart shown in FIG. 8.

Figures 9, 10:
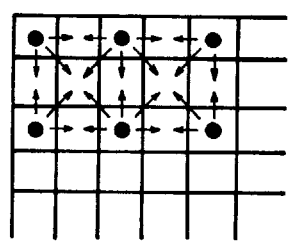
FIG. 9 is a diagram schematically showing reproduced picture frames by a multiframe quick-feed reproducing operation.
FIG. 10 is a diagram schematically showing data used when interpolating data in other blocks using data in the first block.

The quick-feed operation in the present embodiment includes a multiframe quick-feed operation as shown in FIG. 9 in addition to a normal quick-feed operation. That is, in the multiframe quick-feed operation, only first blocks in respective image signals are sequentially reproduced on respective divided picture frames of a divided-in-four picture frame. In the normal quick-feed operation, arbitrary blocks (for example, first blocks) of respective image signals are sequentially reproduced.

The multiframe quick-feed operation will now be explained in detail.

First, as shown in FIG. 8, when a quick-feed switch is switched on (S40), the apparatus detects whether or not the mode set by the above-described reproducing mode setting switch SW4 is a multiframe quick-feed mode (S41). If the set mode is the multiframe quick-feed mode, data of a predetermined block of the image signal for the first frame are received in the memory circuit 7 (S42). The data are then read and are subjected to D/A conversion. The converted data are reproduced on a ¼ picture frame of the monitor 20 (S43).

Next, the apparatus detects whether or not the quick-feed switch has been switched on (operated) again (S44). If the quick-feed switch has been switched on, the magnetic tape is moved to the next data area, that is, the tape position where the image signal for the second frame is recorded (S45).

At this time, the magnetic tape may be fed using an intermittent feeding method wherein the feed amount is changed in accordance with the number of tracks needed to record data for one picture frame.

When new data have been received in the memory circuit 7, data are moved in the memory (S46). The process then returns to step S42 to repeat the above-described operation. Thus, the latest image on the monitor 20 is always positioned at the upper left of the picture frame. Hence, a searching operation can be easily performed.

If the quick-feed switch has not been switched on at step S44, data of the remaining blocks are received in the memory circuit 7 to provide data of all the blocks for one picture frame (S47). The data are then subjected to D/A conversion, and the converted data are reproduced on the monitor 20 (S48).

If the mode is not the multiframe quick-feed mode at the above-described step S41, data of the first block of the image signal for the first frame are first received in the memory circuit d7 (S49). Data of surrounding picture elements are interpolated from the data of the first block by the above-described interpolation circuit 6g to obtain data for one picture frame (S50), as shown in FIG. 10.

The data for one picture frame as a result of the interpolation are reproduced on the monitor 20 (S51).

Next, the apparatus detects whether or not the quick-feed switch has been switched on (operated) again (S52). If the switch has not been switched on, the magnetic tape is moved to the tape position where the next data area, that is, the image signal for the second frame is recorded (S53). The process then returns to step S49 to repeat the above-described operation.

If the quick-feed switch has not been switched on at step S52, data of the remaining blocks are received in the memory circuit 7 (S47), and the received data are reproduced on the monitor 20 (S48).

As described above, according to the present embodiment, by reading image signals recorded in units of a block in units of minimum necessary blocks whenever necessary, a high-speed reproducing operation as described above can be realized without being restricted by the transmission speed.

Furthermore, in the present embodiment, since image signals are processed after first being written in a memory when performing a recording or reproducing operation, freedom in processing may be increased in that, for example, signal processing can be independently performed for every data of respective blocks.

Moreover, when performing a normal reproducing operation with the apparatus of the present embodiment, respective data of the first through fourth blocks are sequentially received in the memory circuit 7, within which the data of respective blocks are synthesized. The data of respective blocks thus received are sequentially reproduced on the monitor 20.

At this time, data of picture elements whose data are not yet present may, of course, be interpolated using the received data. That is, when, for example, data have been received until the data of the second block, the data of the third and fourth blocks (which have not yet been received) may be interpolated using the data of the first and second blocks (which have already been received) until the data of the third and fourth blocks are received, and the resultant data may be reproduced.

It is thereby possible to improve the quality of an image reproduced until all image signals for one frame are received.

Although, in the foregoing embodiment, an image signal for one frame is sampled and divided into four blocks, the number of divided blocks may be larger or smaller than four in consideration of the required image quality, the operation speed (time) and the like.

Although, in the foregoing embodiment, the sampling frequency and quantization bits of the A/D converter 5 are constant, these factors may be changed between image signal recording and reproducing operations and voice signal recording and reproducing operations.

The cassette according to the present invention is not limited to that which receives a magnetic tape, but the cassette may receive various kinds of recording media, such as a magnetic disk, an optical disk or the like.

Furthermore, the signals to be recorded and reproduced are not limited to image signals and voice signals.

As is apparent from the foregoing explanation, according to the present invention, it is possible to reduce inconvenience when image information having a large capacity is handled with a slow transmission speed.

That is, by dividing an image signal for one frame into a plurality of blocks and sequentially recording images in the divided blocks, it is possible to delete data in units of a block whenever necessary, and thereby to shorten a recording time.

Also when reproducing images, it is possible to perform, for example, a high-speed reproducing operation by reproducing only minimum necessary blocks.

Furthermore, by recording information indicating a recording status on a cassette which receives a recording medium, it is possible to improve the control of the apparatus in which the cassette is mounted.

According to the present embodiment, since signal processing is performed while reading digital image signals first stored in the memory circuit 7 in units of a block, it is possible to realize the signal processing by a single-channel signal processing system, and hence to provide a small circuit scale.

Moreover, since independent signal processing is performed in units of a block, data can be independently restored for every block in a reproducing operation. Thus, by reproducing at least data for one block, an image for one picture frame can be obtained.

Although, in the foregoing embodiment, during a recording operation, signal processing for digital image signals is performed entirely after the signals have been read from the memory circuit 7, the compressor 6a or the like, for example, may be provided before (at the input side) the memory circuit 7, as shown by one-dot chain lines in FIG. 1(B). It is thereby possible to reduce the capacity of the memory circuit 7.

As described above, by supplying signals to the memory circuit 7 via the above-described signal processing unit 6, it is possible to properly distribute signal processing in the signal processing unit 6 before and after the memory circuit 7.

Although, in the foregoing embodiment, reproduced signals are directly processed during a reproducing operation, the reproduced signals may, for example, be first received in the memory circuit 7 via signal lines $l_1$ and $l_2$ shown by broken lines in FIG. 1(B), and the above-described signal processing may be performed after distributing the reproduced signals in respective blocks.

It is thereby possible to perform signal processing in a state wherein all the data of respective blocks are received, even if the tracking of the above-described magnetic heads He1 and He2 in a reproducing operation is more or less incorrect, or the tracking control is not performed.

At that time, the rate of reproduction (rate of provision) of the data of respective blocks within the memory circuit 7 may be detected, and the running of the magnetic tape may be controlled in accordance with the result of detection. Alternatively, the supply of reproduced signals from the recording/reproducing unit 8 to the memory circuit 8 or the signal processing circuit 6 may be switched by the switch 6h while watching a reproduced image on the monitor 20.

The individual components shown in outline ore designated by blocks in the Drawings are all well-known in the image recording/reproducing arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the sprit and scope of the appended claims. The scope of the following claims is to be accorded the broadest interpretation so as to encompass all modifications and equivalent structures and functions.

What is claimed is:

1. A recording apparatus comprising:

memory means for storing a digital image signal that comprises a plurality of picture elements for one picture frame;

memory controlling means coupled to said memory means for dividing the digital image signal stored in said memory means into n blocks prior to processing by processing means, where n is an integer equal to at least 3, by reading out the digital image signal from said memory means into n blocks using all the picture elements, each of the n blocks comprising plural picture elements which are within one picture frame but differ from one another, each block comprising picture elements in the same sample pattern, each block containing only picture elements different from picture elements of the other blocks;

mode setting means for setting a recording mode out of a plurality of predetermined recording modes;

processing means for processing the n blocks of picture elements; and recording means for recording a predetermined number m of processed blocks in accordance with said set recording mode, wherein m is an integer less than n, said recording means varying the number m of processed blocks of one picture frame which are recorded in accordance with the set recording mode.

2. A recording apparatus according to claim 1, wherein said memory controlling means comprises means for dividing said image signal into n blocks by subsampling the signal while changing reading positions of the signal from the memory means at every n-time reading operation.

3. A recording apparatus according to claim 1, wherein each of the n blocks comprises a signal for each picture element of a subset of picture elements obtained by equally subsampling the plurality of picture elements constituting the image for one field.

4. A recording apparatus according to claim 1, wherein said processing means comprises a compressor.

5. A recording apparatus according to claim 1, wherein said processing means for sequentially performing signal processing of the n blocks of picture elements, and wherein said processing means comprises an error correcting code adder.

6. A recording apparatus according to claim 1, wherein said processing means comprises an encoder.

7. A recording apparatus according to claim 1, wherein said recording means comprises a plurality of rotating heads for helical scanning a magnetic tape.

8. A recording method comprising the steps of:

storing a digital image signal comprising a plurality of picture elements for one picture frame obtained by one image sensing operation in memory means;

setting a recording mode from a plurality of predetermined recording modes;

dividing the digital image signal stored in the memory means for one picture frame into n blocks, using all the picture elements prior to processing by processing means, where n is an integer greater than 2, each block having a predetermined number of picture elements equal to 1/n picture elements that are sufficient to reconstruct the one picture frame, by selectively reading a plurality of subsets having the predetermined number of picture elements from the memory means using a plurality of subsampling patterns, each block comprising picture elements in the same subsampling pattern, each block containing only picture elements different from the picture elements of the other blocks;

processing the n blocks of picture elements; and recording a predetermined number m of the processed n blocks in respective predetermined areas on a recording medium in accordance with the recording mode set in said setting step, wherein m is an integer less than n, and varying the number of processed blocks of one picture frame which are recorded in accordance with the set recording mode, wherein an amount of data recorded in each area is less than an amount of data stored in said memory means for the one picture frame.

9. A recording method according to claim 8, wherein each block comprises a signal for each picture element of a subset of picture elements obtained by equally subsampling the plurality of picture elements constituting the image signal for one picture.

10. A recording method according to claim 8, wherein said recording medium comprises a magnetic tape, and wherein said predetermined areas comprise predetermined tracks.

11. A recording method according to claim 8, further comprising the step of performing predetermined signal processing on the respective blocks before recording the blocks.

12. A recording method according to claim 11, wherein said signal processing comprises coding.

13. A camera apparatus comprising:

image sensing means for obtaining an image signal, comprising a plurality of picture elements, for one picture frame by performing photoelectric conversion of light from an object;

memory means for storing the image signal for one picture frame obtained from the image sensing means;

memory controlling means for dividing the image signal into n sample blocks of picture elements of the one picture frame using all the picture elements prior to processing by processing means by sequentially reading selected picture elements of said image signal from said memory means in a predetermined sequence, each of the n sample blocks formed from the picture elements of the one picture frame comprising 1/n picture elements that are sufficient to reconstruct the one picture frame, where n is an integer equal to 3 or more, and for reading one said image signal from said memory means, each of said n blocks comprising plural picture elements which are within one picture frame but differ from one another, wherein each sample block comprises picture elements in the same pattern, each sample block containing only picture elements different from the picture elements of the other sample blocks;

processing means for processing the n blocks of picture elements;

mode setting means for setting a photographing mode out of a plurality of photographic modes of said image sensing means; and outputting means for outputting image data of a predetermined number m of the processed n blocks selectively in accordance with the photographing mode set by said mode setting means, wherein m is an integer less than n, so that said outputting means varies the number m of processed blocks of one picture frame which are outputted in accordance with the set photographing mode.

14. A camera apparatus according to claim 13, wherein said outputting means has a mode to perform a recording operation of at least one block irrespective of the time interval between image sensing operations in the successive image sensing operation.

15. A camera apparatus according to claim 13, wherein said memory controlling means comprises means for dividing the image signal so that each of the n blocks comprises a signal for each picture element of a subset of picture elements obtained by equally subsampling the plurality of picture elements constituting the image for one picture.

16. A camera apparatus to claim 13, further comprising recording means for recording the image data output from said outputting means onto a recording medium magnetic tape, and wherein said recording means records the image data in predetermined tracks of the recording medium magnetic tape.

17. A camera apparatus according to claim 13, wherein said memory controlling means and said outputting means each comprise microcomputers.

18. A recording apparatus comprising:
  memory means for storing digital image data that comprises a predetermined number of pixel data included in a same picture frame;
  memory control means coupled to said memory means for dividing the predetermined number of pixel data stored in said memory means into n groups, using all the pixel data, prior to processing by processing means, where n is an integer equal to at least 2, by reading the n groups of pixel data, each of the n groups of pixel data being different data from one another;
  processing means for processing the n groups of pixel data read out from said memory means;
  recording means for recording the image data processed by said processing means;
  mode setting means for setting a mode of said apparatus from a plurality of modes, the plurality of modes including a first mode in which said processing means processes the pixel data in a unit of one of n groups and said recording means continuously records a plurality to picture frames of the image data, each of which represents a different image, and a second mode in which said processing means processes the pixel data in a unit of n groups of pixel data and said recording means records the image data representing an image of one picture frame as a still image.

19. An apparatus according to claim 18, wherein said processing means includes compressing means for compressing the pixel data read out from said memory means.

20. An apparatus according to claim 19, wherein said processing means further includes adding means for adding error correction check code to the pixel data compressed by said compressing means.

21. A recording apparatus comprising:
  memory means for storing a digitized image signal that comprises a plurality of picture elements for one picture;
  memory controlling means coupled to said memory means for dividing the digitized image signal stored in said memory means into n blocks, where n is an integer equal to at least 2, by reading out the digitized image signal from said memory means into n blocks, each of the n blocks comprising plural picture elements which are within one picture but differ from one another and comprising substantially similar sample patterns;
  mode setting means for setting one of a plurality of photographing modes, the photographing modes including a first mode and a second mode, wherein the first mode includes a continuous photographing mode or a mode in which a signal is currently being recorded on a recording medium, wherein the second mode is a recording mode in which a shutter switch is depressed and a continuous photographing mode is not selected and a signal is not being currently recorded on the recording medium; and
  recording means for recording less than n blocks on the recording medium when said mode setting means sets the first mode and recording all the n blocks on the recording medium when said mode setting means sets the second mode.

22. A recording method comprising the steps of:
  digitizing an electrical image signal;
  storing the digitized image signal comprising a plurality of picture elements for one picture obtained by one image sensing operation in memory means;
  setting one of a plurality of photographing modes, the photographing modes including a first mode and a second mode, wherein the first mode includes a continuous photographing mode or a mode in which a signal is currently being recorded on a recording medium, wherein the second mode is a recording mode in which a shutter switch is depressed and a continuous photographing mode is not selected and a signal is not being currently recorded on the recording medium;
  dividing the image signal stored in the memory means for one picture into n blocks, where n is an integer greater than 1, each block having a predetermined number of picture elements equal to 1/n picture elements that are sufficient to reconstruct the one picture, by selectively reading a plurality of subsets having the predetermined number of picture elements from the memory means using a plurality of subsampling patterns, wherein the n blocks comprise substantially similar subsampling patterns; and
  recording less than n blocks on the recording medium when said mode setting means sets the first mode and recording all the n blocks on the recording medium when said mode setting means sets the second mode.

23. A camera apparatus comprising:
  image sensing means for obtaining an image signal, comprising a plurality of picture elements, for one picture by performing photoelectric conversion of light from an object;
  memory means for storing the image signal for one picture obtained from the image sensing means;
  memory controlling means for dividing the image signal into n sample blocks of picture elements by sequentially reading selected picture elements of said image signal from said memory means in a predetermined sequence, each of the n sample blocks formed from the picture elements of the one picture comprising 1/n picture elements that are sufficient to reconstruct the one picture, where n is an integer equal to 2 or more, and for reading one said image signal from said memory means, each of said n blocks comprising plural picture elements which are within one picture but differ from one another, wherein the n sample blocks substantially comprise the same pattern;
  mode setting means for setting one of a plurality of photographing modes of said image sensing means, the photographing modes including a first mode and a second mode, wherein the first mode includes a continuous photographing mode or a mode in which a signal is currently being recorded on a recording medium, wherein the second mode is a recording mode in which a shutter switch is depressed and a continuous photographing mode is not selected and a signal is not being currently recorded on the recording medium; and
  outputting means for outputting less than n blocks on the recording medium when said mode setting means sets the first mode and outputting all the n blocks on the recording medium when said mode setting means sets the second mode.

24. An imaging apparatus comprising:

imaging means for obtaining digital image data by imaging an object, said imaging means dividing the digital image data of one picture into n groups where n is an integer equal to at least 2, each of the n groups comprising plural pixels which are within one picture and differ from one another;

mode setting means for setting one of a plurality of modes, the plurality of modes including a continuous photographing mode and a single photographing mode; and outputting means for outputting the digital image data obtained by said imaging means, said outputting means outputting the digital image data less than n blocks in the continuous photographing mode and outputting all of the n blocks of the digital image data in the single photographing mode.

25. Apparatus according to claim 24, wherein said outputting means includes recording means for recording the digital image data on a recording medium, said recording means recording the digital image data less than n blocks in the continuous photographing mode and recording all the n blocks of the digital image data in the single photographing mode.

26. Apparatus according to claim 25, wherein said recording medium includes a magnetic tape recording medium.

27. Apparatus according to claim 26, wherein said magnetic tape is disposed within a tape cassette device.

28. Apparatus according to claim 27, wherein said tape cassette devices includes holding means for holding retrieving information for retrieving the digital image data recorded on the magnetic tape.

29. Apparatus according to claim 28, further comprising information recording means for recording the retrieving information on the holding means.

30. Apparatus according to claim 25, further comprising audio generating means for generating audio data, said recording means further recording the audio data on the recording medium.

31. Apparatus according to claim 30, wherein said imaging means includes A/D converting means for converting analog image data from an image sensor into the digital image data, said A/D converting means further converting analog audio data into digital audio data, said A/D converting means being used commonly for the conversion of the analog image data and the conversion of the analog audio data.

32. Apparatus according to claim 24, further comprising processing means for processing the digital image data obtained by said imaging means, said processing means including compressing means for compressing an information amount of the digital image data.

33. Apparatus according to claim 32, wherein said processing means includes error correction coding means for error correction coding the digital image data whose information amount is compressed by said compressing means, by using parity codes.

34. Apparatus according to claim 24, wherein each of the n groups comprises plural pixels in the same sampled pattern.

35. Apparatus according to claim 24, further comprising a manually operable member for providing an instruction to set the mode of said apparatus, said mode setting means setting the mode of the apparatus according to the instruction provided by the manually operable member.

* * * * *

UNITED STATES PATENT AND TRADEMARK OFFICE
CERTIFICATE OF CORRECTION

PATENT NO. : 5,867,627

DATED : February 2, 1999

INVENTOR(S) : SABUROU NAKAZATO, ET AL.

It is certified that error appears in the above-identified patent and that said Letters Patent is hereby corrected as shown below:

COLUMN 1,
Line 34, "(kilohertzs))" should read --kilohertz))--.

COLUMN 10,
Line 44, "ore" should read --are--.

COLUMN 11,
Line 41, "scanning" should read --scanning of--.

COLUMN 13,
Line 1, "to" should read --according to--; and
Line 30, "to" should read --of--.

Signed and Sealed this

Twenty-third Day of November, 1999

Attest:

Q. TODD DICKINSON

Attesting Officer     Acting Commissioner of Patents and Trademarks